United States Patent [19]

Mikule et al.

[11] 4,073,310
[45] Feb. 14, 1978

[54] METHOD AND APPARATUS FOR CONTROLLING THE LIQUID LEVEL ABOVE A SOLID BED

[75] Inventors: Jiri Mikule; Wilfried Hecken, both of Cologne, Germany

[73] Assignee: Industrial Filter & Pump Mfg. Co., Cicero, Ill.

[21] Appl. No.: 609,220

[22] Filed: Sept. 2, 1975

Related U.S. Application Data

[63] Continuation of Ser. No. 440,867, Feb. 8, 1974, abandoned.

[30] Foreign Application Priority Data

Feb. 8, 1973 Germany .............................. 2306210

[51] Int. Cl.² .............................................. F16k 21/18
[52] U.S. Cl. ........................................ 137/389; 127/9; 127/46 A; 137/403

[58] Field of Search ............... 137/386, 389, 413, 414, 137/415, 429; 210/24, 121, 127, 138, 263; 127/9, 46 A, 403

[56] References Cited

U.S. PATENT DOCUMENTS

| 2,499,917 | 3/1950 | Harper | 137/429 |
|---|---|---|---|
| 3,200,971 | 8/1965 | Trethewey | 137/403 |
| 3,214,293 | 10/1965 | Mountfort | 127/9 |
| 3,470,902 | 10/1969 | Hackman | 137/386 |
| 3,757,813 | 9/1973 | Levenberg | 137/423 |
| 3,835,881 | 9/1974 | Dal et al. | 137/389 |

Primary Examiner—Alan Cohan
Assistant Examiner—G. L. Walton
Attorney, Agent, or Firm—Edmond T. Patnaude

[57] ABSTRACT

There is described a process and apparatus which compares the pressure at the interface between the upper surface of a granular bed and the liquid in which it is submerged with the pressure above the liquid to maintain a predetermined head of liquid above the bed irrespective of expansion and contraction of the bed.

2 Claims, 1 Drawing Figure

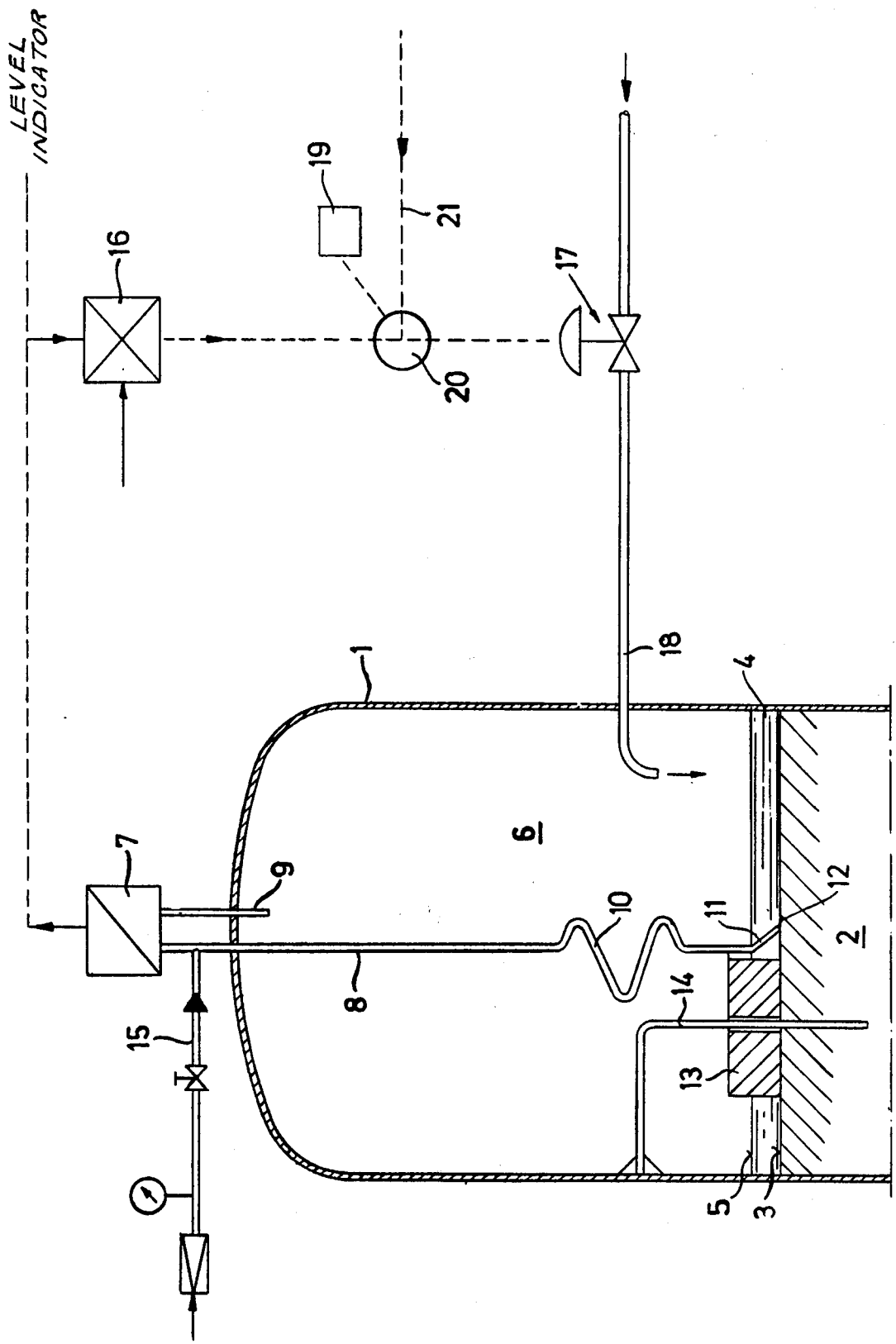

METHOD AND APPARATUS FOR CONTROLLING THE LIQUID LEVEL ABOVE A SOLID BED

This is a continuation of application Ser. No. 440,867, filed Feb. 8, 1974, now abandoned.

The present invention relates in general to a process and apparatus for continuously measuring the head of liquid above a bed of solid material such as an ion exchange resin and for maintaining such head constant irrespective of expansion and contraction of the bed.

BACKGROUND OF THE INVENTION

As is well known to those skilled in the art, it is important to maintain a bed of ion exchange resin covered by liquid at all times. Otherwise the resin may be damaged and the quality and quantity of the liquid passed through the bed are impaired.

The volume of some ion exchange resins varies in relation to the osmotic pressure of the solution in which they are immersed. For example, a cationic exchange resin-cross-linked with 4% divinyl benzene contracts during an infeed with molasses of 60° Brix by approximately 30% compared to the resin in pure water.

This means that a resin column at a level of 9 meters shrinks to a level of almost 6 meters in pure water and the space above the resin bed becomes almost 3 meters greater.

It is not possible, therefore, to regulate the liquid level by means of level regulators, such for example, as a conductivity analyzer fixedly positioned at the top of the upper edge of the resin bed in pure water, since the incoming medium would be mixed with the solution above the resin bed in strongly contracted resin which would considerably impair the separating effect. One must therefore take particular care that the resin is constantly covered by liquid; however, the amount of liquid found above the resin surface prior to the addition of a liquid with another composition must be as small as possible.

These general rules are valid for all solid material beds which can be vertically altered. They are also especially valid for the attainment of sugar following the procedure of excluding ion in which sugar solutions for the separation of interferring components, pure water for elutriation and strong common salt solutions for regeneration are consecutively introduced to the column. If there is a high liquid level above the resin bed, various fractions which have been introduced, mix, whereby the separating effect of the column and thus the entire sugar output are impaired.

There is a known type of device which attempts to eliminate the detrimental influence of the change in volume of the resin bed. This device consists in the fact that the arrangement for the control of the operation of the valves which control the output of the crude washing waters treated by means of the ion exchanger and of the hot water to the column of the ion exclusion, has a volume control in each one of the inlet pipes and the volume control in its operation is controlled by a differential detector and an electric relay is operated, as long as a sequence switch in an electric switching network is present which is controlled by the relay while the operation of the volume control is regulated.

The aforesaid differential detector consists of a conductivity probe device attached in the middle of a float which gives a signal to an electric relay when the liquid level above the resin bed is less than 6.35 mm. It thus works in a noncontinuous fashion and indicates whether the medium surrounding it is electrically conductive or not. It is assumed here that the liquid is above the resin bed, as long as the analyzer indicates conductivity. This stipulation, however, is not true with foaming media, since the foam serves as a good conductor and thus the automatic control system is not interrupted at the right time, or not at all, which results in no further liquid being conducted to the column whereby the resin bed falls dry. If this occurs, the resin column must be rinsed back immediately, which results in operational interference.

This well-known controlling procedure is subject to further problems if solutions with extremely varying conductivity such as common salt or demineralized water are supplied to the column. If there is a small amount of sensitivity in the conductivity probes, the circuit is not closed during feeding with water; if the amount of sensitivity of the probe is too high, or if the liquid film clings to the float and the probe the relay will remain closed.

The present invention provides a method and apparatus for measuring and adjusting the liquid head over a bed of a solid material in a reliable fashion by means of a differential pressure detector, a regulating device and a controllable valve.

Further objects and advantages and a better understanding of the present invention can be had by reference to the following detailed description, wherein the single FIGURE is a schematic drawing of a level control system embodying the present invention.

The column 1 is filled with ion exchanger resin 2 up to the upper edge 3 and filled with liquid 4 up to the liquid level 5. Above this is the gas area 6. The pneumatic differential pressure transmitter 7 is placed outside of the column. It is connected with the interior of the column by two pipes 8 and 9. Pipe 8 has a connection 15 for the introduction of a constant gas flow and includes a flexible hose 10 which terminates in a bubble pipe 11 having a nozzle 12 at the lower end.

The bubble pipe 11 is attached to a float 13 which is vertically guided by a guide rod 14. The differential pressure transmitter 7 is connected by a pressure line with a pneumatic regulator 16 to which a pneumatic control valve 17, which is installed in the line for the liquid input 18, is switched.

The procedure according to the invention consists in the fact that by means of the bubble pipe 11 immersed in the liquid 4 above the resin bed 2, a gas stream is introduced, the necessary pressures are fed to a differential pressure transmitter 7, compared by the latter with the gas pressure in the gas area 6 above the liquid 4, the measured differential pressure in the transmitter 7 is converted into a pneumatic unit signal and thus with the help of the regulator and the control valve, the rate of flow of the liquid input is controlled such that the liquid head above the solid material bed remains constant.

By jeans of the float 13 lying on the top surface 3 of the resin, the measured differential pressure, which can be measured continuously and independently of the absolute pressure in the column, is a measure of the liquid level above the resin. This is the stipulation for a continuous regulation of the level 5 above the resin 2. One should take specific care here that for a given differential pressure, the head of liquid above the resin is dependent on the specific gravity of the liquid 4. A differential pressure of 20 mm of water column, for example, for water, indicates a level of 20 mm and for a solution with the specific gravity of 1.3, indicates a level of 15.4 mm above the upper edge 3 of the resin bed 2.

The float 13 is constructed in such a fashion that while floating freely in water, it has an immersion depth of $h$ mm. The liquid level adjusted above the resin bed is $x_1$ mm for water and is thus $x_2$ mm for media with higher specific gravities than 1.0. If the equation is $h > x_1 > x_2$, which is guaranteed by the construction of the float, then the float body lies on the top surface of the resin bed during normal operation.

The measured differential pressure is converted in the transmitter 7 to a proportional pneumatic output signal of 0.2 to 1.0 atm., which is standard, and is conducted to a pneumatic regulator 16.

The regulator 16, relays a normal output signal $y$ to the control valve 17 which controls the liquid input to the tank in such a fashion that the head of liquid above the resin 2 remains constant. The control valve 17 is designed in accordance with flow rate and the pressure conditions.

It is conceivable that the float 13 during extremely high running velocities of the liquid settles into the resin 2 after a long period of time. During extremely quick expansion of the resin, it is also possible that the swelling resin surrounds the float. In order to prevent these interferences, which can occur, however, only under extreme operational conditions, the device according to the invention can also include a timer relay 19 which periodically interrupts the pneumatic control system for a short period of time by operation of a three-way valve 20 which connects pressurized air from a pressure air line 21, to the valve 17 to fully open the valve 17 so that the liquid level above the resin attains the level $h$ which results in the freeing of the float.

In an operational example, the float body is designed as a cylindrical metal hollow body with a diameter of 200 mm and a height of 60 mm. It has an opening in the middle through which the vertical guide rod extends. On one side of the float the air-bubble pipe is placed, the outlet opening of which lies just above the bottom edge of the float. Together with the bubble pipe, the flexible tube for the connection of the bubble pipe with the air conduit and the differential pressure transmitter and the balance weights, the float has, on an average, a specific gravity of 0.75. There is an ensuing immersion depth $h$ of the float in the water of 45 mm. The desired value of the pneumatic regulation is thus set at 20 mm water column. For a medium with a specific gravity of 1.3, for example, there ensures a liquid level of $x_2 = 15.4$ mm.

This automatic adjustment of a lower liquid level above the resin bed for liquids of a higher specific weight is desired and advantageous. Thus, in the initial addition of wash water following the regeneration with a regenerating solution of a specific gravity of 1, for example, the lower liquid head of the regeneration solution above the resin counteracts further concentration attenuation.

The procedure according to the present invention also allows a continuous addition of the solutions to the column which compared to a more periodic addition has the advantage, among other things, that the dosage is more precisely regulated and the pressure of the liquid column in the total column is not subject to any strong and sudden fluctuations. Therefore, it is intended by the appended claims to cover all changes and modifications which come within the true spirit and scope of this invention.

What is claimed is:

1. Apparatus for controlling the rate of flow of a liquid through a tank containing a bed of solid granular material so as to maintain a constant depth of said liquid above said bed irrespective of changes in the volume of said bed material comprising, a float having a specific gravity such that when floating freely in said liquid it has a depth of immersion greater than said constant depth, said float being located within said tank and resting on said bed, means providing an output signal related to the pressure differential between two fluid inputs thereto, a conduit connected between one of said inputs and a position near the top of column, a bubble pipe carried by said float and connected to the other of said inputs, said bubble pipe having a downwardly facing open lower end disposed in proximity to the bottom of said float, means for passing fluid into and down through said pipe whereby it flows out said open lower end, control means responsive to said output signal for controlling the rate of flow of said liquid into said tank to maintain said constant depth of said liquid above said bed, and time controlled means for periodically supplying liquid to said tank independently of said output signal to maintain a sufficient head of liquid above said bed to cause said float to float above the upper surface of said bed.

2. Apparatus according to claim 1 wherein said liquid supplied to said tank under the control of said timer means is water.

* * * * *